US012109897B2

(12) United States Patent
Litjes et al.

(10) Patent No.: US 12,109,897 B2
(45) Date of Patent: Oct. 8, 2024

(54) BATTERY MANAGEMENT SYSTEM AND METHOD

(71) Applicant: NXP B.V., Eindhoven (NL)

(72) Inventors: Alphons Litjes, Zijtaart (NL); Hendrik Johannes Bergveld, Eindhoven (NL); Alexander Vogt, Hamburg (DE); Cristian Pavao Moreira, Frouzins (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/193,721

(22) Filed: Mar. 31, 2023

(65) Prior Publication Data

US 2023/0331090 A1  Oct. 19, 2023

(30) Foreign Application Priority Data

Apr. 13, 2022  (EP) ..................................... 22315087

(51) Int. Cl.
| | |
|---|---|
| *B60L 3/04* | (2006.01) |
| *B60L 3/00* | (2019.01) |
| *B60L 58/10* | (2019.01) |
| *G01S 13/931* | (2020.01) |

(52) U.S. Cl.
CPC .............. *B60L 3/0007* (2013.01); *B60L 3/04* (2013.01); *B60L 58/10* (2019.02); *B60L 2260/50* (2013.01); *B60Y 2306/01* (2013.01); *G01S 13/931* (2013.01)

(58) Field of Classification Search
CPC .. B60L 3/0007; B60L 3/00; B60L 3/04; B60L 58/10; B60L 58/40; B60L 2260/50; G01S 13/931; H02J 7/0025; H01M 10/441; B60Y 2200/91; B60Y 2200/92; B60Y 2306/01; B60W 10/26; B60R 16/033
USPC ........... 180/279, 65.1, 65.21, 65.275; 701/22
See application file for complete search history.

(56) References Cited

U.S. PATENT DOCUMENTS

| | | | |
|---|---|---|---|
| 6,919,707 B2 | 7/2005 | Kawai et al. | |
| 9,209,628 B2 | 12/2015 | Thieme et al. | |
| 10,086,705 B2* | 10/2018 | Chow | ..................... B60L 58/20 |
| 10,315,500 B2* | 6/2019 | Schroth | ............... H01M 50/242 |

(Continued)

FOREIGN PATENT DOCUMENTS

| | | |
|---|---|---|
| CN | 102837616 B | 4/2015 |
| CN | 109141798 A | 1/2019 |

(Continued)

OTHER PUBLICATIONS

Bisschop, R., "Handling Lithium-Ion Batteries in Electric Vehicles: Preventing and Recovering from Hazardous Events", Fire Technology, Sep. 8, 2020.

(Continued)

*Primary Examiner* — Keith J Frisby

(57) ABSTRACT

In an embodiment, there is provided a battery management method for a vehicle comprising a plurality of batteries. According to another embodiment there is a control unit for performing the battery management method. The battery management method comprising detecting an incoming hazard; predicting an impact of the incoming hazard from one or more sensors coupled to the vehicle; determining a course of action to be taken in response to the predicted impact; and controlling one or more batteries of the plurality of batteries according to the determined course of action.

18 Claims, 7 Drawing Sheets

(56) References Cited

U.S. PATENT DOCUMENTS

| | | | |
|---|---|---|---|
| 10,714,736 B2 | 7/2020 | Torok et al. | |
| 2010/0026242 A1 | 2/2010 | Forslow | |
| 2013/0175999 A1 | 7/2013 | Thieme et al. | |
| 2015/0051771 A1* | 2/2015 | Greenwood | B60L 3/04 701/22 |
| 2015/0094901 A1* | 4/2015 | Brenneis | B60R 21/00 701/1 |
| 2016/0276854 A1 | 9/2016 | Lian | |
| 2016/0339782 A1 | 11/2016 | Seong et al. | |
| 2016/0357188 A1* | 12/2016 | Ansari | G06T 17/00 |
| 2020/0023727 A1* | 1/2020 | Omura | H01M 8/2475 |
| 2021/0300352 A1 | 9/2021 | Newman et al. | |

FOREIGN PATENT DOCUMENTS

| | | | | |
|---|---|---|---|---|
| CN | 110979174 A | 4/2020 | | |
| CN | 111845736 A | 6/2020 | | |
| DE | 102010008203 A1 * | 8/2011 | | B60L 3/0007 |
| DE | 102013001324 A1 | 12/2013 | | |
| DE | 102014006071 A1 * | 10/2015 | | B60L 3/0007 |
| DE | 102014002146 B4 | 11/2016 | | |
| EP | 2909065 B1 | 8/2020 | | |
| GB | 2500427 B | 9/2019 | | |
| JP | 2006143141 A | 6/2006 | | |
| KR | 101880762 B1 | 7/2018 | | |
| KR | 20200083793 A | 7/2020 | | |

OTHER PUBLICATIONS

Pylon Technologies Co., Ltd., "Lithium-Ion Phosphate Energy Storage System Force-H2 Operation Manual", Information Version: 2.2, 20P2FH0301, https://www.master-instruments.com.au/file/66638/2/Pylontech-Force-H2-96-288.pdf, retrieved from the internet Feb. 15, 2023.

Wang, Z., "Impact Safety Control Strategy for the Battery System of an Example Electric Bus", Hindawi Publishing Corporation, Mathematical Problems in Engineering, vol. 2015, Article ID 123626, 12 pages, http://dx.doi.org/10.1155/2015/123626, Oct. 5, 2015.

Wynne, J., "Isolation in High-Voltage Battery Monitoring for Transportation Applications", Analog Dialogue 43-10, Oct. 2009.

\* cited by examiner

BATTERY MANAGEMENT SYSTEM AND METHOD

CROSS-REFERENCE TO RELATED APPLICATIONS

This application claims the priority under 35 U.S.C. § 119 of European Patent application no. 22315087.1, filed on 13 Apr. 2022, the contents of which are Incorporated by reference herein.

FIELD

The present disclosure relates to a method of controlling a battery management system (BMS) and a control unit for controlling the BMS.

BACKGROUND

In current Battery Management Systems (BMS), damage to batteries by physical force caused by a vehicle crashing into another vehicle is a large problem. The BMS systems typically run at high voltage (400V or higher) and contain flammable chemicals. A crash event could cause lethal circumstances. Some systems address this issue by systematically shutting down the entire battery network of the vehicle in response to an impact. However, since this is done at the time a crash occurs there is little time available for delicate or optimised solutions to prevent damage.

SUMMARY

According to a first aspect, there is provided a battery management method for a vehicle comprising a plurality of batteries. The method may comprise detecting an incoming hazard; predicting an impact of the incoming hazard with the vehicle using one or more sensors coupled to the vehicle; determining a course of action to be taken in response to the predicted impact; and controlling a subset of the plurality of batteries according to the determined course of action. A subset is a number of batteries (individual batteries, battery modules or a number of cells within a battery module) that is less than the total number of the plurality batteries. The plurality of batteries may be a a battery pack comprising a plurality of battery modules. Each battery module may comprise a group of cells. The impact prediction preferably predicts an impact before the impact occurs between the vehicle and the incoming hazard.

Advantageously, an incoming hazard, such as a nearby moving car or other vehicle heading towards the vehicle comprising the plurality of batteries, and a predicted impact of said incoming hazard can be detected and mitigated for depending on features of the predicted impact. Alternatively, the vehicle itself may be heading for a collision with a stationary or moving object. Predicting that the vehicle itself may be causing an impact can also be mitigated for using the same method. Sensors coupled to the vehicle comprise information suitable for making a prediction about an impact that the incoming hazard may cause with the vehicle (or vice versa) before any physical contact has been made. Sensors may include radar units, touch sensors, visual sensors and/or one or more external sources. In response to the predicted impact, the method comprises determining a course of action linked to controlling one or more battery cells, groups of battery cells and/or battery modules of the vehicle prior to (or close to) the physical impact. This may improve the safety of one or more persons involved, and may further help to limit the damage caused to the vehicle and the incoming hazard by pre-emptively responding to the predicted impact. Independently controlling one or more of the batteries (e.g. one or more battery cells and/or groups of cells and/or battery modules), and not for example the entire plurality of batteries comprising the battery pack at once, has numerous advantages, for example in relation to mobility of the vehicle post-impact. Sensitivity of a battery management method is improved and a proportionate response to the incoming hazard can therefore be made according to the method of the first aspect.

In some embodiments, the one or more sensors may comprise one or more radar units and predicting an impact may comprise receiving or sending radar data concerning information about the incoming hazard. Optionally, the radar parameters may comprise a range, a velocity, a direction of arrival and/or a radar cross section. Radar parameters convey data which can be used by the battery management system to detect the incoming hazard and predict a force of the impact, whether the incoming hazard is stationary or moving. These predictions can be further used to determine a course of action to be taken in response to the determined impact. Radar parameters may be determined locally to the vehicle from one or more radar units located at the vehicle.

In some embodiments, the radar data may comprise information concerning direction of arrival. Predicting the impact may comprise, based on the direction of arrival information, predicting a location of the impact of the incoming hazard on the vehicle. Identifying a predicted location of an impact allows the battery management method to better determine a course of action to be taken in response to the predicted impact.

In some embodiments, the radar data may comprise range, velocity and radar cross section information. Predicting the impact may comprise, based on the range, velocity and radar cross section information, a predicted force of the impact. Identifying a predicted force of the impact allows the battery management method to better determine a course of action to be taken in response to the predicted impact.

Optionally, wherein predicting an impact comprises, based on the radar parameters, predicting a location of the predicted impact of the incoming hazard on the vehicle and a predicted force of the impact.

In some embodiments, controlling the one or more batteries (e.g. battery cells, groups of battery cells and/or battery modules) may comprise selecting one or more batteries to be disabled. Optionally, selecting the one or more batteries to be disabled may comprise predicting, for each battery of the plurality of batteries, whether the battery would be damaged by the predicted impact; and selecting the one or more batteries which are predicted to be damaged. Disabling batteries selectively may help to prevent damage of the selected batteries whilst maintaining functionality of the unselected batteries. Disabling may comprise turning batteries off, entering a standby mode, or a safety mode.

In some embodiments, a staggered battery shutdown procedure may be determined comprising a preferential order in which to disable the one or more selected batteries. Staggering battery disabling advantageously allows batteries which are more likely to be damaged or hit first being disabled prior to batteries which are less likely to be damaged, for example.

In some embodiments, batteries close to an outside of the vehicle may be selected to be switched off first. Optionally, batteries located centrally, for example a main battery, are selected to be disabled last.

In some embodiments, determining a course of action may comprise making no change to the state of the plurality of batteries. For example, if a predicted impact location is located external to the vehicle or if the predicted force of the impact is low such that none of the batteries will be damaged. Not disabling any of the plurality of batteries can be particularly advantageous, for example if it is determined that it is safe to do so, since re-enabling the batteries can be a long and energy consuming process, in some vehicles the batteries may not even be able to be re-enabled once they have been disabled. Full battery operation also provides the vehicle with unaffected mobility capabilities compared to partial battery operation resulting from disabling of one or more batteries available.

In some embodiments, the method may further comprise predicting a crash trajectory as a result of the impact of the incoming hazard with the vehicle. Advantageously, being able to predict the first impact with some accuracy enables further information to be determined about the effects of the impact on the vehicle. Predicting a crash trajectory can be important in determining where the vehicle may move to as a result of the impact.

In some embodiments, the method may further comprise predicting a secondary impact of the vehicle to be caused as a result of the predicted crash trajectory. For example, if the predicted crash trajectory indicates that the vehicle is likely to cause the vehicle to impact another static or moving object.

In some embodiments, the method may further comprise determining a second course of action to be taken in response to the predicted secondary impact; and controlling one or more batteries of the plurality of batteries according to the determined second course of action. Controlling the batteries may comprise controlling one or more unselected batteries which have not already been disabled as a result of the first impact prediction.

In some embodiments, the method may further comprise receiving information concerning the incoming hazard from one or more external sources configured to communicate with the vehicle. Optionally, the one or more external sources may be another vehicle or a stationary system. Optionally, a communication between the vehicle and the one or more external sources may be a low-latency communication.

In some embodiments, the method may further comprise moving the vehicle by controlling one or more of the plurality of batteries, for example in a constellation that still allows the vehicle to use its electrical engines. For example, to move the vehicle to a safer location or to reduce the predicted damage of the impact on the vehicle.

In some embodiments, the method may further comprise communicating the impact to one or more emergency services.

According to a second aspect, there is provided a control unit for controlling a plurality of batteries in a vehicle. The control unit may comprise one or more processors. The control unit may be configured to: detect an incoming hazard; predict an impact of the incoming hazard with the vehicle using information received at the control unit from one or more sensors coupled to the vehicle; determine a course of action to be taken in response to the predicted impact; and control a subset of the plurality of batteries according to the determined course of action.

According to a third aspect there is provided a vehicle comprising a control unit according to the second aspect.

According to a fourth aspect, there is provided a battery management system for a vehicle comprising: one or more radar units; a plurality of batteries; and a control unit according to the second aspect. The plurality of batteries may be independently controllable. Optionally, further comprising a communications unit configured to communicate with an emergency service and/or one or more external radar sources. In some embodiments, the one or more radar units may comprise all-round radar scanners.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
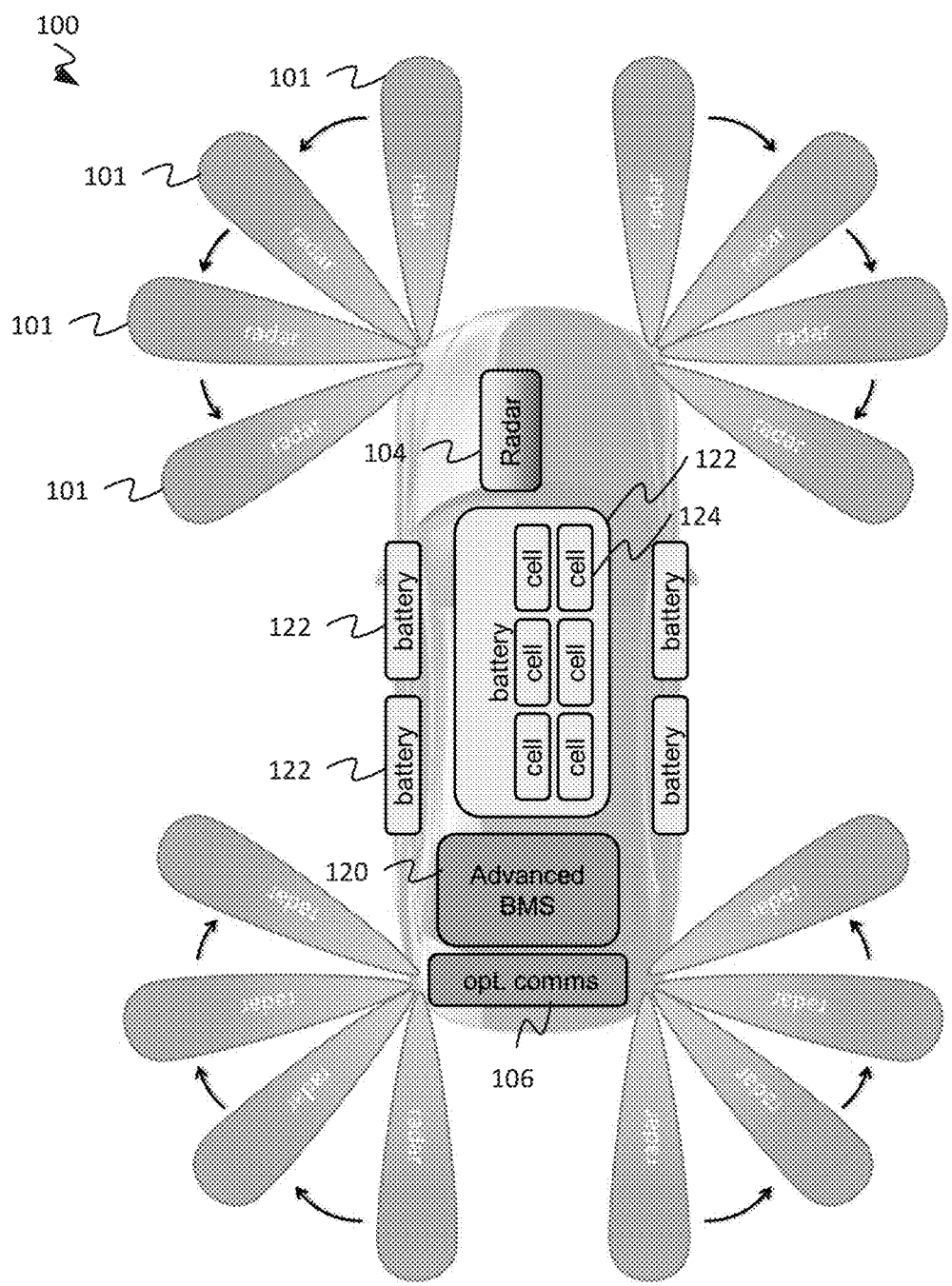
FIG. 1 illustrates a schematic diagram of a vehicle comprising a battery management system according to an embodiment of the disclosure.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

The present disclosure describes an extension and improvement of battery management systems (BMS) for managing batteries in a vehicle, for example battery modules and battery cells of a battery pack. In response to determining a predicted impact, one or more batteries which form part of the BMS can be controlled. For example, a subset of one or more batteries may be disabled in response to determining a predicted impact.

A basic system which does not have an improved BMS of the present disclosure might, in response to predicting a crash, put the batteries in a (non-recoverable) safe state. If the impact was to be small, for example by contact with a bicycle, the actual impact caused by the bicycle may not cause any actual harm to the batteries. Converting the batteries to a safe state in this situation may be unnecessary. Re-enabling the batteries may further be time and energy consuming. In some systems there may not even be the option to re-enable the batteries and so minimising the number that are disabled can be particularly beneficial. An advanced system as disclosed herein could determine the severity of the impact and in turn determine an appropriate and proportionate response, disabling (or not disabling) batteries as appropriate to the specific situation.

In some examples, improvements can be made to prediction capabilities of a BMS based on native radar, visual and other parameters, which can provide information about an incoming hazard. Radar parameters can include: range, velocity, direction of approach (DOA), and radar cross section (RCS). With this information, a more advanced BMS can be realised which can predict impact severity and optimize post-crash power output which, for example, can be used for post-crash mobility. Post-crash mobility can help to get any passengers inside the vehicle to a safer location. It could also help to prevent further impacts. For example, reducing the hazard to other road users by clearing the vehicle from a road and reducing the chance of further impacts.

The present disclosure concerns vehicles comprising batteries (e.g. battery packs) split into modules or groups of cells which can be placed in multiple locations throughout the vehicle, in doors for example, and controlled separately. Some of these batteries may be selectively disabled to preserve them and to improve the overall safety of the vehicle. This can help to limit damage caused to the vehicle and, for example, improve the safety of one or more passengers.

In some examples, the predicted impact's direction of approach (DOA) and force are determined, and individual batteries (e.g. battery modules, groups of cells or individual cells) can be disabled pre-impact as a result of these calculations. For instance, a proportionate level of battery control can be determined in response to the predicted impact. In a first example, when the impact is expected to be relatively small, door batteries close to the predicted impact site on the vehicle can be disabled, whilst the battery in the centre and on the other side of the vehicle opposite to the predicted impact site may remain functional to allow post-crash mobility towards a safer area. In more severe predicted impacts, however, all the batteries may be disabled to improve immediate safety pre-impact.

FIG. 1 illustrates a schematic diagram of a vehicle 100 comprising a battery management system (BMS) according to an embodiment of the disclosure. The vehicle comprises one or more radar units 104, batteries 122, for example comprising individual battery cells 124, an advanced BMS 120 comprising a control unit and an optional communications unit 106. The radar units(s) 104 may comprise all-round radar scanners 101 configured to scan radar in all directions from the vehicle 100 comprising the BMS. Other sensors, such as visual sensors, touch sensors and/or LIDAR units are not illustrated but may be present on the vehicle 100.

Batteries 122, 124 are located about the vehicle 100, for example at either side of the vehicle 100 (e.g. located in one or more doors), at the front, the rear and/or centrally to the vehicle 100. A centrally located battery 122 may be a "main" battery (or battery module) having the greatest number of battery cells 124 for example.

The BMS 120 or advanced BMS (ABMS) comprises a control unit configured to receive one or more signals from one or more sensors, such as from one or more radar unit(s) 104, LIDAR unit(s) or camera(s)/visual sensor(s) present on the vehicle 100. Further signals may be provided to the BMS 120 from external sources external to the vehicle 100 via the communications unit 106. The control unit is configured to run calculations in the pre-impact time frame from the data it receives from one or more sensors to predict features of the impact such as impact time, location and force. Calculations are discussed in more detail in relation to FIG. 4 below.

All-round radar scanners 101 are configured to undertake all-round radar scanning which can be run in different modes. The different modes may be chosen depending on the external situation of the vehicle 100. Radar modes may include those that are wide and relatively inaccurate to those that are small and accurate. Car/vehicle radar has a number of different modes of operation that could be used. For example, radar modes may be different if a driver is driving in reverse compared to a driver which is driving at up to or over 100 km/h on the highway.

By using native radar parameters such as range, velocity, Direction Of Arrival (DOA) and Radar Cross Section (RCS), the system can predict the damage of the impact. This predictive system can be made which allows for more time pre-crash to provide damage limitation procedures to be applied.

The system is not limited to its own radar units 104 and other sensors. Parameters including radar data can also be communicated to the vehicle 100 from other vehicles and/or stationary systems in proximity to the vehicle 100. Communication between these entities can be by means of low-latency (e.g. cellular) communication. Detailed pre-crash information of the surroundings of the vehicle 100 coming from the native radar and surrounding entities (other cars and vehicles, infrastructure) can therefore be used to build up a detailed picture of the environment around the vehicle 100.

In response to determining or predicting an impact, the BMS 120 is configured to determine a response, or a course of action, to take to improve the safety of the vehicle 100. This includes, for example, controlling a subset of the one or more batteries 122.

In one example, this may include disabling one or more of the batteries 122, battery modules, group of cells or individual cells 124. If the impact is predicted to have an impact on one side of the vehicle 100 with a force above a predetermined threshold, the BMS 120 could then decide to turn off (or disable) only some of the batteries of the plurality of batteries (i.e. only certain modules or groups of cells or batteries that are predicted to be damaged). The number of batteries 122 selected to be disabled as part of the subset may be based on predictions of the force of the impact with the vehicle 100, which may be calculated using data received at the BMS 120 such as radar parameters including RCS, range and velocity data. Other considerations may include a predicted location of the impact which may be predicted based on DOA data. This may determine which of the batteries are to be disabled.

The BMS 120 should include enough individual batteries to control the vehicle 100 pre- and post-crash. The plurality of batteries 122 having a multitude of separate controllable modules or cells 124 is therefore desired. Individually controllable cells could be envisioned in cell-to-pack concepts, for example where separately packaged modules are not used. In general, the granularity of parts of the plurality of batteries 122 that can be switched off or disabled depends on the trade-off between finer control of parts of the complete pack versus additional hardware in the form of switches and wiring. It will be appreciated that there is a flexibility to determining the granularity of how to address and control the battery modules or cells some of which have finer control, and others which have fewer cell divisions; the numerous variations of how to address the battery modules and cells are all envisaged herein.

Having some modules or groups of cells 124 of the plurality of batteries 122 still available for use (i.e. not disabled), the vehicle 100 may have enough battery power for post-impact mobility, such as (autonomous) driving to a safe location, and/or power to contact or communicate with one or more emergency services or other objects in the vicinity such as other vehicles having the required capabilities. Low-power applications, such as those required to make an outgoing communication, may run on a separate battery 122, such as an always-present 12V battery which is separate from the plurality of batteries 122, and which may be separately controllable to the plurality of batteries 122.

In some embodiments, a staggered battery shutdown procedure can be utilised which prioritises batteries to be disabled in a preferential order. For example, a subset of outer batteries, such as batteries located inside vehicle 100 doors may be chosen to be disabled first. In particular, batteries close to a predicted impact site of an incoming hazard may be chosen to be disabled first. Advantageously, this can help to prevent one or more of the plurality of batteries 122 of the system which are located near to the predicted impact site from being damaged and/or catching fire when the predicted impact happens. Safety is therefore improved.

Disabling a further subset of central batteries 122, which may include a main or central plurality of batteries, such as a battery pack e.g. comprising a number of cells 124, can be preferentially disabled after a first subset of outer batteries have been disabled. In some examples, this may allow for some batteries 122 to remain useable to continue controlling the vehicle 100 for example to allow post-impact mobility.

The present disclosure can be implemented in a number of applications. The battery management system described herein can, for example, be used in electric vehicles. Preferably, wherein the electric vehicles have advanced radar capabilities. The system and methods can also be applied to electric vehicles which do not have radar functionality but instead get their parameters from one or more other sensors comprised in the vehicle 100 including visual and touch sensors and/or can receive information through a communication channel, such as cellular communication unit 226 which can provide detailed surrounding information and which can be provided from other vehicles and/or surrounding infrastructure having the requisite capabilities to receive the information before the impact happens. It will be appreciated that the present disclosure is not limited to electric vehicles, and the systems and method described herein can also be applied to multiple energy sources, such as hybrid cars. In hybrid systems, the BMS 120 may not be limited to controlling the plurality of batteries in a crash event, but may also control other energy sources.

Figure 2:
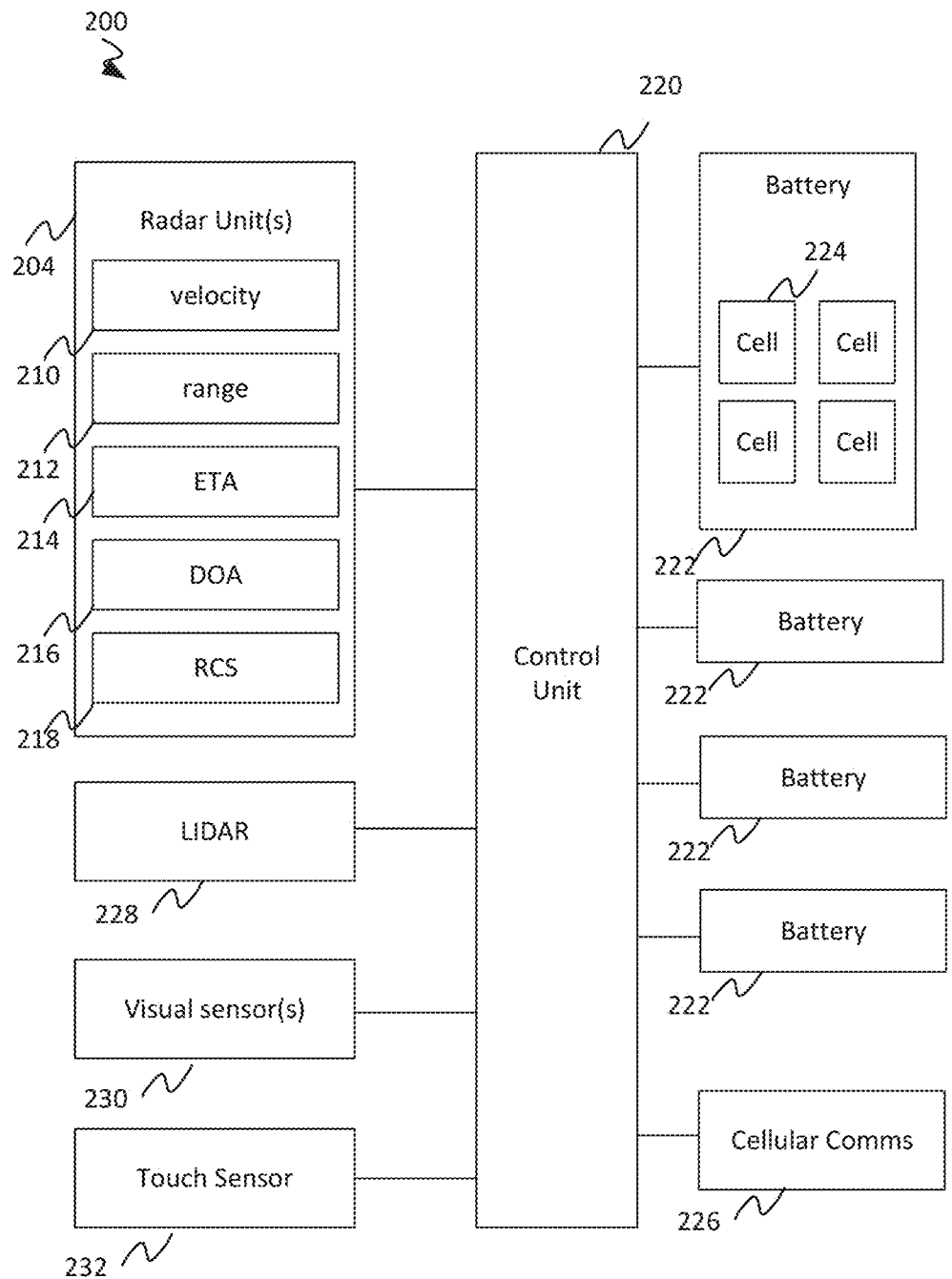
FIG. 2 illustrates a schematic diagram of a control unit according to an embodiment of the disclosure.

FIG. 2 illustrates a schematic diagram of a battery management system (BMS) 200 comprising a central control unit 120 according to an embodiment of the present disclosure. The BMS 200 comprises a control unit 220 configured to receive inputs (e.g. signals) from one or more sources coupled to the vehicle 100 and send outputs (e.g. signals) to one or more batteries 122 or other communications 226.

Data is input to the control unit 220 from one or more radar unit(s) 204, LIDAR 228, visual sensor(s) 230, touch sensor(s) 232 and/or via a cellular communications unit 226. Radar parameters measured by the radar unit(s) 204 include: velocity data 210, range data 212, estimated time of arrival (ETA) data 214 (which may also be called estimated time of impact), direction of arrival (DOA) data 216, and radar cross section (RCS) data 218.

The control unit 220 is configured to control a plurality of batteries 122, which may comprise one or more cells 124. The batteries 122 are typically located about the vehicle 100 as described in relation to FIG. 1 above.

The control unit 220 may also optionally comprise a cellular communications unit 226 allowing communication with one or more external sources. The control unit 220 can send and receive information, such as input data and output data, via the cellular communications unit 226. The cellular communications unit 226 may send and receive low-latency communications. Communications via a computer network such as an internet network may also be possible through the communications unit 226.

The control unit 220 comprises one or more processors configured to operate the BMS. Control unit 220 represents one or more general-purpose processors such as a microprocessor, central processing unit, or the like. More particularly, the processing device of the control unit 220 may be a complex-instruction-set computing (CISC) microprocessor, reduced-instruction-set computing (RISC) microprocessor, very-long-instruction-word (VLIW) microprocessor, processor implementing other instruction sets, or processors implementing a combination of instruction sets. The processing device may also be one or more special-purpose processing devices such as an application-specific integrated circuit (ASIC), a field-programmable gate array (FPGA), a digital signal processor (DSP), network processor, or the like. The processing device of the control unit 220 is configured to execute the processing logic for performing the operations and steps discussed herein.

The control unit 220 further comprises a memory or data storage device which may include one or more machine-readable storage media (or more specifically one or more non-transitory computer-readable storage media) on which is stored one or more sets of instructions embodying any one or more of the methodologies or functions described herein. The instructions may also reside, completely or at least partially, within a main memory and/or within the processing device during execution thereof by the BMS, the main memory and the processing device also constituting computer-readable storage media.

Figure 3:
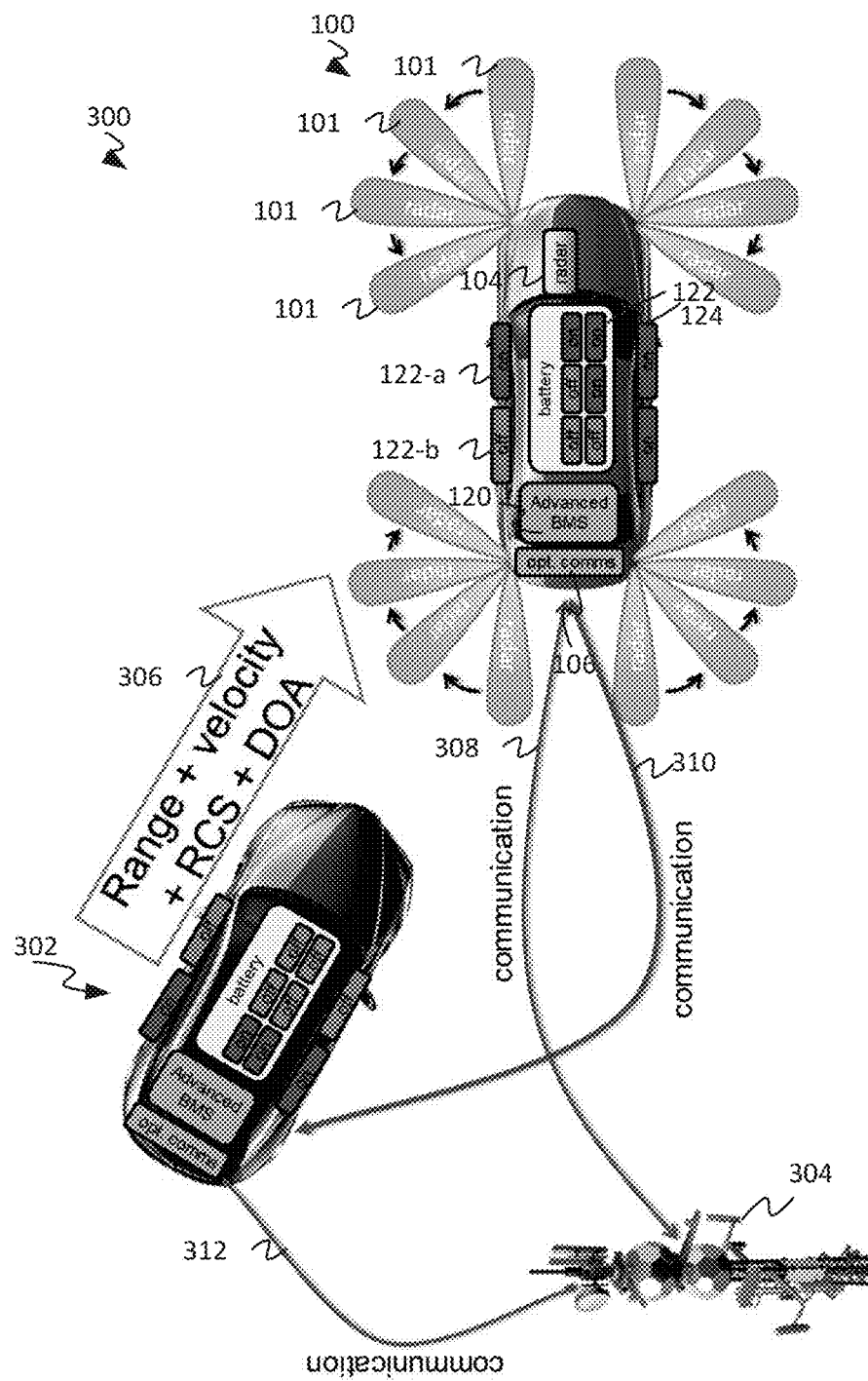
FIG. 3 illustrates an example communication network comprising vehicles and a communication infrastructure according to an embodiment of the disclosure.

FIG. 3 illustrates an example communication network 300 comprising vehicles 100, 302 and a communication infrastructure which may be a static communication infrastructure 304. A first vehicle 100 is a vehicle as described above in relation to FIGS. 1 and 2. In FIG. 3, the first vehicle 100 is predicted to be hit by a second vehicle 302. The second vehicle 302 is an incoming hazard to the first vehicle 100 and may or may not be equipped with the same BMS system as described above in relation to FIGS. 1 and 2. The communication infrastructure 304 is located in the vicinity of the two vehicles 100, 302 such that it is within a range to be able to communicate with at least the first vehicle 100. In some embodiments, the static communication infrastructure 304 may also communicate with the second vehicle 302, if the second vehicle 302 has the inherent capability to communicate with the static communications infrastructure 304. The communications infrastructure may be a static radar system(s), roadside camera or the like which can detect or predict an impact between two objects.

The first vehicle 100, as mentioned above, is equipped with the method and system described above in relation to FIGS. 1 and 2. The second vehicle 302 may also be equipped with a similar system, which is configured to communicate with the first vehicle 100 via a communications unit 106. Communications may be bidirectional between the communications units of the first and second vehicles 100, 302 via a first communication channel 310.

The first vehicle 100 can predict that it will be hit by the incoming second vehicle 302 based on data received from its own internal BMS systems. The data received at the BMS 120 includes information about the first vehicle 100 which is determined or measured through internal systems and equipment including one or more radar units 104, visual and/or touch sensors. Data received at the BMS 120 from internal measurements may include radar parameters such as the range, velocity, RCS and DOA. Other data received at or determined by the BMS 120 may comprise further information including weather conditions or other external factors. External information may be provided to the BMS 120 via a communications unit 106 configured to communicate via the communications network 300.

With the time gained by the first vehicle 100 being able to predict an impact compared to relying on a simple touch sensor to simply indicate that an impact has happened, with no prior warning available, the vehicle 100 has more time to classify and predict a severity and force of the impact to be caused to the first vehicle 100. This in turn can provide time to determine a course of action to be taken to reduce the severity of the impact such as by disabling one or more batteries of a plurality of batteries controlled by a control unit or BMS 120.

In FIG. 3, the first vehicle 100 predicts a location of an impact with which an oncoming hazard of a second vehicle 302 will hit the first vehicle 100. In this case, the BMS 120 determines from received data that an impact of the second vehicle 302 with the first vehicle 100 will occur on the left-hand side of the first vehicle 100 towards the rear by a target which is classified as the second vehicle 302. Based on this data, it may be determined that the best option for post-crash mobility of the first vehicle 100 is to turn off the batteries closest to the impact site at the rear left of the vehicle 100.

Optionally, communications can be sent and/or received from and to the vehicles 100, 302 through a first communication channel 310 which forms part of a communication network 300. The communication network 300 may further comprise one or more static communications infrastructures 304. Communications can be made via the communication network 300 between the first vehicle 100 and the second vehicle 302 via a first communication channel 310. Data 306 including radar parameter information such as range, velocity, RCS and DOA calculated or measured at the second vehicle 302 could be sent via the first communication channel 310. Communications are made between the first vehicle 100 and the static communications infrastructure via a second communication channel 308. It may also be possible for communications between the second vehicle 302 and the static communications infrastructure 304 to be made via a third communications channel 312. In some examples, radar data may be communicated through any of the communication channels 308, 310, 312.

Communications relayed over the communications network 300 to the first vehicle 100 from the second vehicle 302 and/or the static communications infrastructure 304 are received at a communications unit 106 of the BMS system 120.

The static communications infrastructure 304 may comprise a radar system(s) and/or camera(s) that can help to determine that one object is likely to hit another in a crash. Any such determination can be relayed via the communication channels 308, 312.

A vehicle such as the second vehicle 302 having suitable radar infrastructure can also receive information (e.g. radar information) from the first vehicle 100 and/or the static communications infrastructure 304. If suitably enabled with a BMS 120 as described above, the second vehicle 302 can also predict that it will impact the first vehicle 100 at a predicted location of the second vehicle 302 and with a predicted force. In some examples, the second vehicle 302 could be sent this information directly from the first vehicle 100 via the first communication channel 310.

In response to receiving or predicting an impact with the first vehicle 100, the second vehicle 302 may turn off (e.g. disable) one or more of a plurality of its batteries to an off state 122-b. For example, as illustrated in FIG. 3, the second vehicle 302 may be configured to disable one or more batteries at the front portion of the vehicle in response to predicting that it will hit the first vehicle 100 head on. The remaining batteries which are located away from the predicted impact location remain in an on state 122-a.

In an alternative scenario, a moving vehicle may be equipped with a BMS 120 of the present disclosure and about to crash into a further vehicle which may be moving or stationary. In this example, the moving vehicle can predict its own impact with the further vehicle and may be able to communicate the predicted impact to the further vehicle. This can be beneficial when the further vehicle is not equipped with its own sensors (e.g. radar units) and so cannot detect or predict the incoming moving vehicle or predict an impact.

Figure 4:
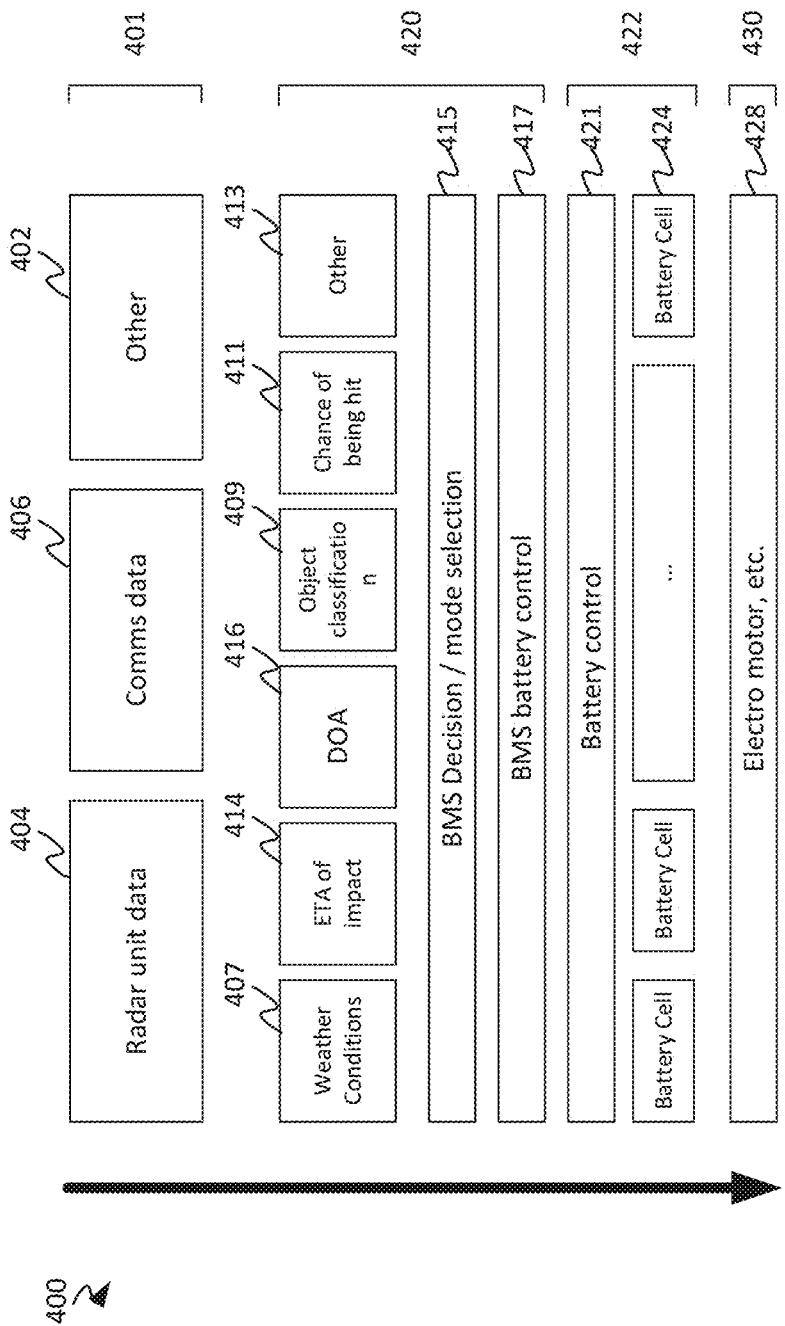
FIG. 4 illustrates a control flow process according to an embodiment of the disclosure.

FIG. 4 illustrates a control flow process of the BMS 400 (also called advanced BMS, ABMS or control unit). The signal flow comprises receiving raw information from one or more sensors and inputs 401, determining a predicted impact and a suitable course of action using dedicated software implemented by a processing unit 420 and controlling battery hardware 422 in response to the determined course of action.

Raw data information received from sensors and inputs 401 may include locally collected data including but not limited to radar unit data 404 and communications data 406 received via the communications network as described above in relation to FIG. 3. Other data 402 may include visual data collected from one or more cameras, LIDAR data from one or more LIDAR units, and touch data from one or more touch sensors. Touch sensors, which sense when an impact occurs, may be helpful in determining a staggered shut down procedure as described above. For example, the processing unit 420 may trigger disabling of a subset of batteries which are next in the sequence (e.g. a next or further subset that is close to the site of the impact but not those batteries or cells which have already been disabled at the predicted impact site). In other examples, the touch sensor registering the impact may determine that the impact occurs with more or less force than expected and the disabling procedure can be adjusted accordingly.

A processing unit 420 determines a predicted impact from an incoming hazard and a course of action to be taken in response to determining of the predicted impact. Predicting the impact may be determined from received data information inputs 401. The processing unit 420 is split into three sections: a signal interpretation unit, a decision-making unit 415 and a control unit 417 (e.g. a battery control unit). Signal interpretation includes determining from the raw data information inputs 401 one or more of: weather conditions 407, an estimated time of arrival (ETA) which estimates a predicted time of the impact 414, a direction of arrival (DOA)

of the incoming hazard 416, object classification 409, chance of being hit 411 and/or other information 413.

Weather conditions 407 can be determined from one or more of radar data and/or visual data received from one or more cameras. In other examples, weather conditions may be received via an internet network. This information may be continuously available to the processing unit 420 which uses weather conditions 407 in its calculations.

Velocity data can determine the speed with which the incoming hazard is approaching. Range data indicates how far away the incoming hazard is. The estimated time of the impact, also called estimated time of arrival (ETA) 414 can be calculated from range and velocity data received as radar data 404 from one or more local or external radar units by calculating range divided by velocity.

DOA 416 can be calculated from radar data comprising DOA information received from one or more local or external radar units and/or visual data from one or more cameras.

Object classification 409 comprises information determining a predicted force of an impact with an incoming hazard. The predicted force of the impact is calculated using radar cross section (RCS) radar data which is a measure of how detectable an object is by radar, along with velocity data. RCS data is used to determine an expected mass of the incoming hazard. Expected mass multiplied by velocity gives a resulting impact force. For example, large, heavy vehicles such as lorries will have a large RCS because they reflect a large proportion of radar energy back to the source and will be easy to detect. A bicycle, however, will have a smaller RCS because it reflects a limited amount of radar energy back to the source. Object classification can be useful to determine a predicted force of an impact which the incoming hazard will have on the local vehicle.

A chance of being hit 411 can be calculated using data such as velocity data concerning the incoming hazard (relative to the local vehicle), range data and DOA data as measured by one or more radar units 104 and/or RCS. Minimum braking distance of the incoming hazard (or the vehicle itself) may be calculated.

Other predictions and/or calculations 413 may include predicting a secondary impact resulting from a first impact with the incoming hazard. This is described in more detail below in relation to FIG. 7.

The decision-making unit 415 uses data processed by the signal interpretation unit to firstly predict that an impact is going to take place. The decision-making unit 415 also determines a course of action to be taken in response to predicting an impact.

Impact prediction at the decision-making unit 415 takes into consideration information provided by the signal interpretation unit. The impact prediction may comprise combining independently calculated parameters to generate an overall picture of the predicted impact. This overall picture may concern predicting when the impact will occur, where it will be and how forceful it will be. In some examples, the decision-making unit 415 determines whether the predicted impact force is above a predetermined threshold. The predetermined threshold may indicate whether or not a battery will suffer damage as a result of the impact force. From this, it can be determined how much damage may be caused to the vehicle, and the batteries, by the impact. Having an accurate picture of the predicted damage allows for a course of action to be determined which is proportionate to the predicted damage, and which can optimise safety. The decision-making unit determines the course of action to be taken.

A course of action to be taken may include one or more of the following actions:

take no evasive action, for example if the impact is predicted to not cause serious damage or injury (e.g. if the information indicates a low RCS, no predicted impact)

determine a subset of one or more batteries of the plurality of batteries to be individually controlled and disabled disable all of the plurality of batteries determine an order in which to disable the one or more batteries to be disabled communicate with one or more surrounding vehicles or objects including static infrastructure communicate the incident to one or more emergency services determine a crash trajectory move the vehicle to a safe location The battery control unit 417 that forms part of the processing unit 420 determines the battery status of each of the plurality of batteries to be executed as a result of the course of action. Battery status includes: on, off, standby, disabled, etc. The battery control unit 417 sends signals to the battery control hardware 421 to control the one or more batteries and cells 122, 124 as determined.

Signals can also optionally be sent from the processing unit 420 to control an electric motor 428 of the vehicle if the course of action includes moving the vehicle.

Figure 5:
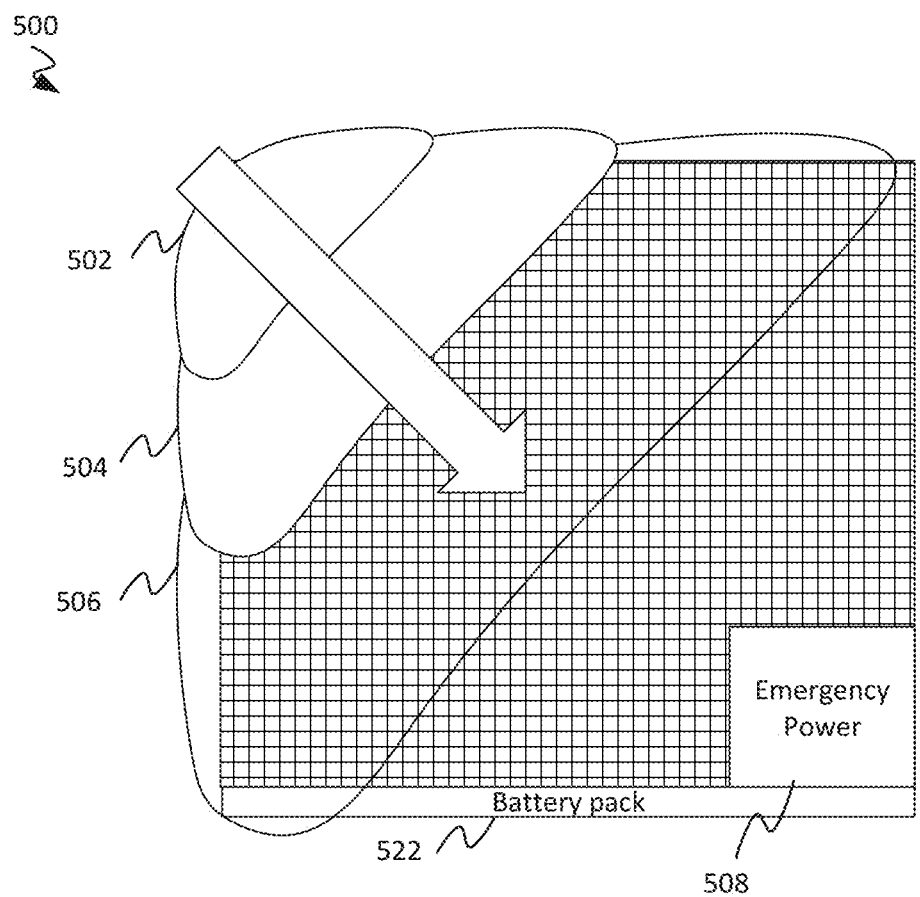
FIG. 5 illustrates a graphical representation of expected collision parameters according to an embodiment of the disclosure.

FIG. 5 illustrates a graphical representation of expected collision parameters. Based on expected collision predictions, the BMS controls one or more batteries of the plurality of batteries.

FIG. 5 shows a collection of cells which form the battery pack 522. A predicted impact could be classified into large 506, medium 504 or small 502 predicted impact as illustrated in FIG. 5. The percentage of batteries/cells to be disabled may be determined based on these classifications. For a large impact 506 a greater number of batteries of the total battery pack 522 are disabled compared to a smaller impact such as a medium 504 or small 502 predictions as illustrated.

A subset of batteries/cells may be required to be available for providing emergency power 508. In some examples, there could be a minimum number of batteries/cells which are needed to provide this emergency power 508 which may be known to the advanced BMS described above.

Optimising the power available to the vehicle post-impact is important to control post-impact mobility. The range that the vehicle will be able to move is increased the more the batteries are available. Minimising the number of batteries to be turned off or disabled is therefore advantageous and desirable.

Figure 6A:
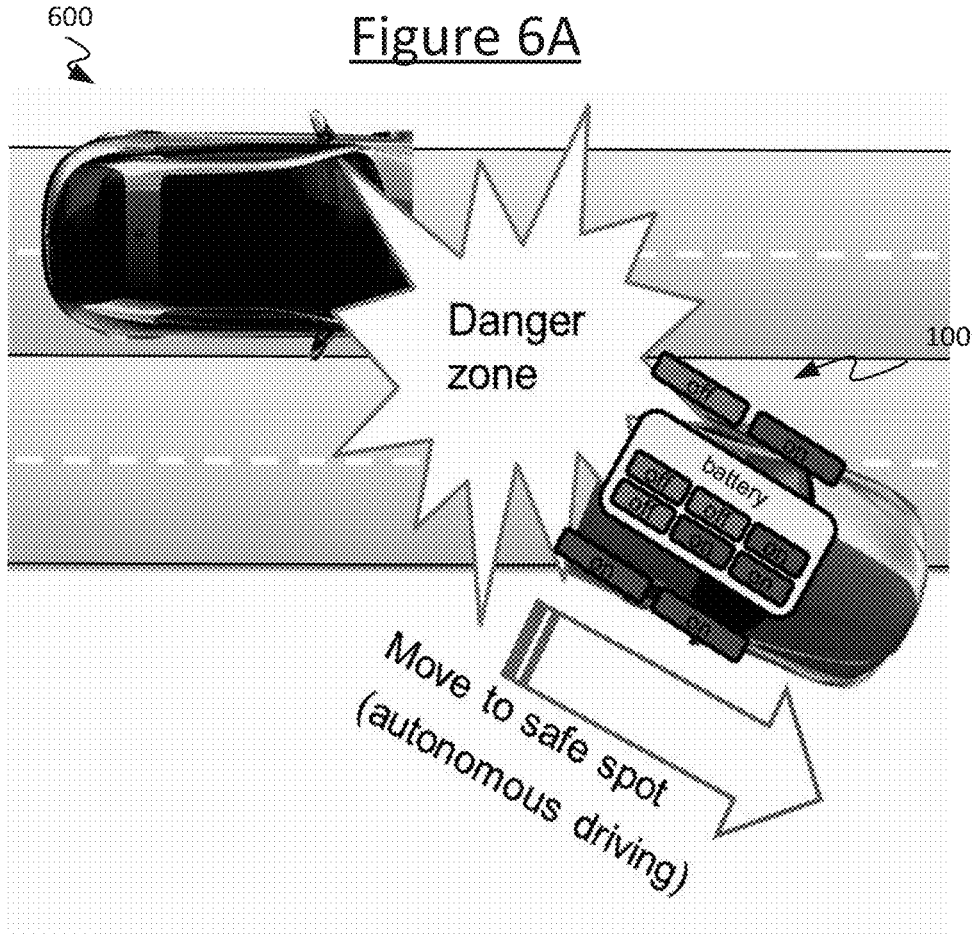
FIGS. 6A and 6B illustrate example impacts of a vehicle with a car and a bike respectively.

FIG. 6A illustrates an example impact of a first vehicle 100 with another vehicle 600.

The first vehicle 100 determines that a crash will occur between the other vehicle 600 and the first vehicle 100. Both of the vehicles 100, 600 are travelling along a road in this example. The predicted impact site is at a left-rear side of the first vehicle 100, and the predicted force is above a predetermined threshold which indicates that one or more batteries should be disabled.

In this example, a selection of batteries of the plurality of batteries have been disabled or switched "off" in response to the determination made by the control unit 400, whilst some batteries remain "on" and functional. Post-impact the first vehicle 100 has sufficient power to move away from the danger zone, e.g., from a highway into a hard shoulder. The advanced BMS system provided in the first vehicle 100 can optimise the available power for post-crash mobility. The better the optimised post-impact battery pack constellation (comprising batteries or battery cells which remain "on") the further the range that the first vehicle 100 can be moved post-impact.

Figure 6B:
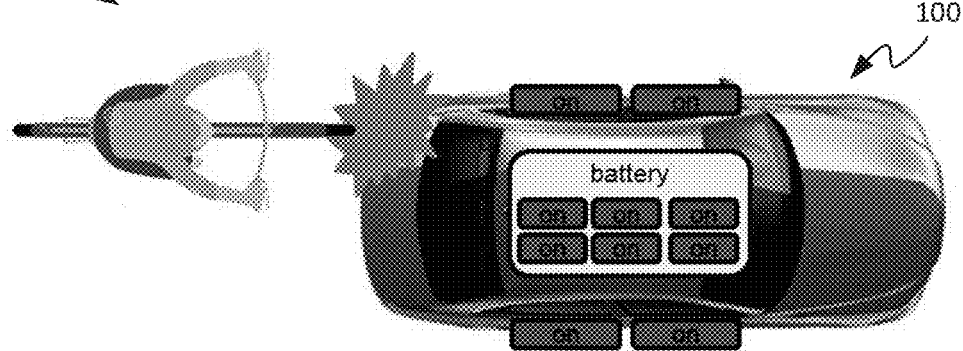

FIG. 6B illustrates an example of an impact of a first vehicle 100 with a bicycle 650.

In some examples, the determined course of action determined by the decision-making unit 415 may be to maintain the plurality of batteries in an "on" state.

The first vehicle 100 determines that a crash will occur between the bicycle 650 and the first vehicle 100; however, the target as determined by the object classification 409 is classified as non-harmful due to the received RDS radar data information which indicates that the predicted impact force will be low, for example below a threshold impact force. The cyclist and bicycle 650 are predicted to not have enough force to damage any of the plurality of batteries, even at the impact site. Therefore, in this scenario, the BMS system of the first vehicle 100 will keep the plurality of battery cells operational.

In FIG. 6B, an example of a low-force impact with a cyclist is used. However, it will be appreciated that the force of the impact, in this case determined as being low, will be the leading factor in this example of determining whether or not one or more batteries will be damaged from the impact. In other examples, if a larger or heavier vehicle travelling at a slow speed, for example <1 km/h, a BMS decision made by the decision-making unit 415 to maintain the plurality of batteries as operational could also be determined based on the data collected and as calculated in the object classification unit 409.

Figure 7:
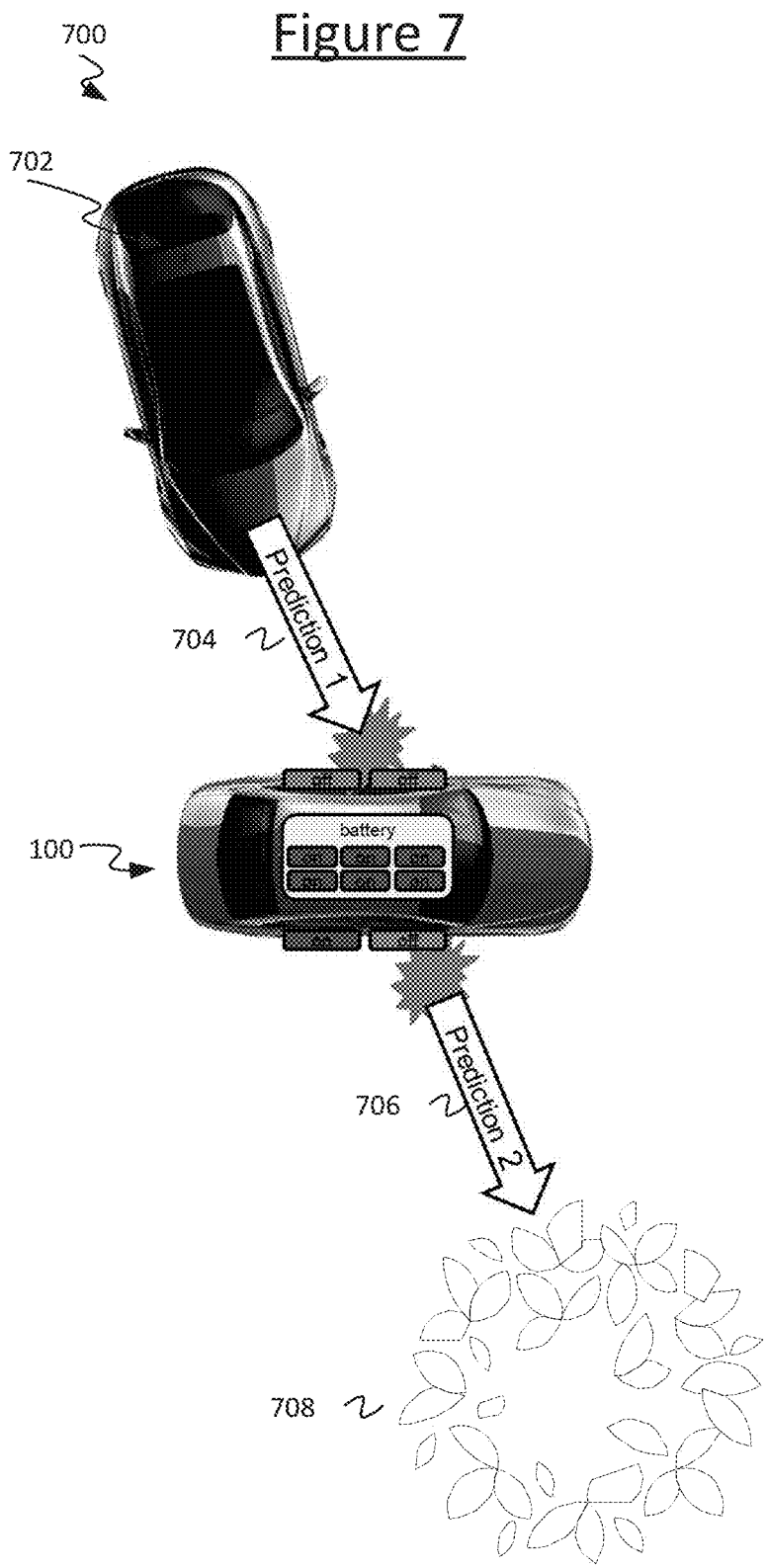
FIG. 7 illustrates an example of a dual impact scenario according to an embodiment of the disclosure.

In some embodiments, crash trajectory and/or post-crash impacts can be predicted. FIG. 7 illustrates an example of a dual impact scenario in which a first vehicle 100 is hit by another vehicle 702 in a first predicted impact 704 on a left-hand side of the first vehicle 100, and which may be predicted to hit another object in a second predicted impact 706 such as a tree 708 on the right-hand side of the first vehicle 100. The second predicted impact 706 may be directly resulting from the predicted first impact 704.

Examples of dual-crash or cascading events include hitting a tree 708 as a result of an impact with another vehicle 702 as illustrated in FIG. 7, but also includes other scenarios such as impacts with further vehicles, for example possibly causing a pileup accident comprising multiple head-to-tail collisions on a busy road.

The first vehicle 100 is able to sense its complete 360° environment as described above, for example by using all-round radar scanners. As a result, the BMS 120 of the first vehicle 100 can also be configured to predict a post-impact trajectory of the first vehicle 100. In some examples, the BMS 120 can also be configured to predict one or more secondary impacts that may happen as a consequence of a predicted first impact 704 and predicted trajectory. If all of the plurality of batteries are disabled in the first vehicle 100, this can affect post-crash mobility. Partial disabling or staggered disabling of the plurality of batteries in response to predicting a first impact 704 can be used to maintain mobility options available to the first vehicle 100 for longer such that it may be able to move to avoid a predicted secondary impact 706.

Classifying the predicted impact to predicted impact location, impact speed and predicted impact force aids post-impact trajectory and mobility calculations.

In the example illustrated in FIG. 7, the BMS 120 of the first vehicle 100 comprising the control unit 220 described in relation to FIG. 2 can turn-off or disable batteries on the first and second predicted impact sites from the second vehicle 702 and tree 704 respectively and optionally in a determined staggered order designed to maintain battery power for as long as possible in relation to the scenario. In this way, the advanced system described above can predict events a few steps ahead of an initial first impact and does not disable all of the plurality of batteries at once, instead determining an appropriate course of action for the particular situation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A battery management method for a vehicle comprising a plurality of batteries, the method comprising:
   detecting an incoming hazard;
   predicting an impact of the incoming hazard with the vehicle using one or more sensors coupled to the vehicle;
   determining a course of action to be taken in response to the predicted impact; and
   controlling a subset of the plurality of batteries according to the determined course of action;
   wherein the one or more sensors comprise one or more radar units and predicting an impact comprises receiving radar data concerning information about the incoming hazard;
   wherein the radar data comprises information concerning direction of arrival;
   wherein predicting the impact comprises, based on the direction of arrival information, predicting a location of the impact of the incoming hazard on the vehicle;
   wherein the radar data further comprises range, velocity and radar cross section information; and
   wherein predicting the impact comprises, based on the range, velocity and radar cross section information, a predicted force of the impact and/or a predicted time of the impact.

2. The method of claim 1, wherein controlling the subset of batteries comprises selecting one or more batteries to be disabled.

3. The method of claim 2, wherein selecting the one or more batteries to be disabled comprises predicting, for each battery of the plurality of batteries, whether the battery would be damaged by the predicted impact; and
   selecting the one or more batteries which are predicted to be damaged.

4. The method of claim 2, further comprising determining a staggered battery shutdown procedure comprising a preferential order in which to disable the one or more selected batteries.

5. The method of claim 4, wherein batteries close to an outside of the vehicle closest to the predicted impact are selected to be switched off first.

6. The method of claim 1 wherein determining a course of action comprises making no change to a state of the plurality of batteries.

7. The method of claim 1, further comprising predicting a crash trajectory as a result of the impact of the incoming hazard with the vehicle.

8. The method of claim 7, further comprising predicting a secondary impact of the vehicle to be caused as a result of the predicted crash trajectory.

9. The method of claim 8, further comprising determining a second course of action to be taken in response to the predicted secondary impact; and
controlling one or more batteries of the plurality of batteries according to the determined second course of action.

10. The method of claim 1, further comprising receiving information concerning the incoming hazard from one or more external sources configured to communicate with the vehicle.

11. The method of claim 1, further comprising moving the vehicle by controlling one or more of the plurality of batteries.

12. A control unit for controlling a plurality of batteries in a vehicle, the control unit configured to:
detect an incoming hazard;
predict an impact of the incoming hazard with the vehicle using information received at the control unit from one or more sensors coupled to the vehicle;
wherein the information includes radar data concerning information about the incoming hazard;
determine a course of action to be taken in response to the predicted impact; and
control a subset of the plurality of batteries according to the determined course of action;
wherein the radar data comprises information concerning direction of arrival;
wherein the control unit is configured to predict the impact, based on the direction of arrival information, predicting a location of the impact of the incoming hazard on the vehicle;
wherein the radar data further comprises range, velocity and radar cross section information; and
wherein the control unit predicting the impact comprises, based on the range, velocity and radar cross section information, a predicted force of the impact and/or a predicted time of the impact.

13. A vehicle comprising a control unit according to claim 12.

14. The control unit of claim 12, wherein the control unit selects one or more batteries to be disabled.

15. The control unit of claim 14, wherein selecting the one or more batteries to be disabled comprises predicting, for each battery of the plurality of batteries, whether the battery would be damaged by the predicted impact; and
selecting the one or more batteries which are predicted to be damaged.

16. The control unit of claim 14, wherein the control unit determines a staggered battery shutdown procedure comprising a preferential order in which to disable the one or more selected batteries.

17. The control unit of claim 14, wherein batteries close to an outside of the vehicle closest to the predicted impact are selected to be switched off first.

18. The control unit of claim 12, wherein the control unit predicts a crash trajectory as a result of the impact of the incoming hazard with the vehicle; and
further comprises predicting a secondary impact of the vehicle to be caused as a result of the predicted crash trajectory.

* * * * *